United States Patent
Yang et al.

(10) Patent No.: US 8,586,703 B2
(45) Date of Patent: Nov. 19, 2013

(54) LOW PROFILE LUBRICANT WITH CYCLOPHOSPHAZENE RING ATTACHED

(75) Inventors: Jiping Yang, San Jose, CA (US);
Michael Joseph Stirniman, Fremont, CA (US); Xiaoding Ma, Fremont, CA (US); Jing Gui, Fremont, CA (US)

(73) Assignee: Seagate Technology LLC, Cupertino, CA (US)

( * ) Notice: Subject to any disclaimer, the term of this patent is extended or adjusted under 35 U.S.C. 154(b) by 894 days.

(21) Appl. No.: 12/144,340

(22) Filed: Jun. 23, 2008

(65) Prior Publication Data
US 2009/0318664 A1 Dec. 24, 2009

(51) Int. Cl.
*C08G 79/02* (2006.01)
*C08G 65/327* (2006.01)
*G11B 5/62* (2006.01)

(52) U.S. Cl.
USPC ........... 528/399; 528/397; 528/400; 428/800; 427/127

(58) Field of Classification Search
USPC ........... 528/399, 397, 400; 428/800; 427/127
See application file for complete search history.

(56) References Cited

U.S. PATENT DOCUMENTS

| | | | |
|---|---|---|---|
| 6,816,341 B2 | 11/2004 | Matsumoto et al. |
| 7,026,509 B2 | 4/2006 | Russo et al. |
| 7,833,641 B2 | 11/2010 | Tomiyasu |
| 8,039,132 B2 | 10/2011 | Shimizu |
| 8,063,003 B2 | 11/2011 | DiMeo |
| 2006/0123440 A1 | 6/2006 | Liu et al. |
| 2007/0060487 A1 | 3/2007 | Burns et al. |
| 2007/0225183 A1 | 9/2007 | Sasa et al. |

FOREIGN PATENT DOCUMENTS

| | | |
|---|---|---|
| JP | 8319491 | 12/1996 |
| JP | 2000-260017 | 9/2000 |
| JP | 2003-217110 | 7/2003 |
| JP | 2007-193924 | 8/2007 |
| WO | WO 2007/043450 | 4/2007 |
| WO | WO 2008/000706 | 1/2008 |
| WO | WO 2008/140121 | 11/2008 |

OTHER PUBLICATIONS

U.S. Appl. No. 12/186,402, entitled "Mixture of Low Profile Lubricant and Cyclophosphazene Compound," filed Aug. 5, 2008.
Office Action received in U.S. Appl. No. 12/186,402, dated Oct. 6, 2009, 8 pp.

*Primary Examiner* — Duc Truong
(74) *Attorney, Agent, or Firm* — Mueting Raasch & Gebhardt PA

(57) ABSTRACT

A compound comprising a backbone with a perfluoropolyether chain. The compound also has one or more cyclophosphazene rings attached to or incorporated into the backbone. The compound further includes at least two functional groups attached to the backbone, attached to the one or more cyclophosphazene rings, or a combination thereof.

5 Claims, 4 Drawing Sheets wherein ⓟ is a cyclophosphazene ring, Z is a perfluoropolyether chain, X is a mono or multifunctional group, and n is an integer.

LOW PROFILE LUBRICANT WITH CYCLOPHOSPHAZENE RING ATTACHED

BACKGROUND

Recording densities in hard disk drives have been steadily increasing. Indeed, recording densities of 100 gigabits per square inch (Gbit/inch$^2$) have been reported. A requirement for achieving these high densities is to reduce the distance between the magnetic head and the magnetic recording layer of the magnetic disk as much as possible. Currently, this distance is generally 20 nm.

To reduce this distance as much as possible, the surface roughness of the magnetic disk should be reduced as much as possible. Therefore, there has been a transition from the contact start/stop (CSS) systems to load/unload (L/UL) systems. In CSS systems, the magnetic head is in contact with the magnetic disk when the disk is not spinning and the magnetic head flies up due to air currents when the magnetic disk begins spinning. In L/UL systems, the magnetic head is retracted away from the magnetic disk (unloaded) when the disk is stopped and is loaded on to the magnetic disk when the magnetic disk begins spinning. Further, in L/UL systems, anti-sliding characteristics can be relaxed somewhat. The hard disk drive, however, must be able to withstand impacts from load-on operations as well as sudden irregularities in head orientation that can occur even in normal operations.

Traditionally, perfluoropolyether (PFPE) based lubricants have applied been on the top surface of the magnetic disk to reduce friction. However, PFPE based lubricants, such as Zdol and Ztetraol suffer from catalytic decomposition in the presence of Lewis acids, like $Al_2O_3$. It is believed that hydrogen fluoride (HF) is generated due to thermal decomposition from friction heat or decomposition, and that this HF causes a chain reaction that leads to further decomposition of the lubricating agent.

Additionally, long chain PFPE lubricants such as ZDol and ZTetraol have a further drawback. Because ZDol and ZTetraol only have functional groups (hydroxyl groups) on the two ends of perfluoropolyether (PFPE) chain, the chain tends to bulk up on the surface of the disk. The bulked up chain results in a lubricant with a high profile.

Furthermore, mixtures of high profile PFPE lubricants with PFPE lubricants having a cyclophosphazene ring group have been reported. However, a mixture of two or more compounds imposes a difficulty for process control, e.g. different lube uptaken between these two compounds, control of the ratio of these two compounds at different locations on the disk, etc. Also phase separation of the compounds has been observed in the case of ZDol/X1P, and ZTetraol/X1P mixtures.

SUMMARY

Embodiments of the present invention include a compound comprising a backbone comprising a perfluoropolyether chain, one or more cyclophosphazene rings attached to or incorporated into the backbone, and at least two functional groups attached to the backbone, attached to the one or more cyclophosphazene rings, or a combination thereof.

Preferred embodiments of this invention are shown and described, simply by way of illustration of the best mode contemplated for carrying out this invention, in the following detailed description. As will be realized, this invention is capable of other and different embodiments, and its details are capable of modifications in various obvious respects, all without departing from this invention. Accordingly, the description is to be regarded as illustrative in nature and not as restrictive.

DETAILED DESCRIPTION

Low profile lubricants are a new type of hard disk drive lubricant that allow the read/write head to fly lower on (or closer to) the media surface. This is because the low profile lubricant lies down more flatly on media surface. That is, the roughness of low profile lubricants is lower than traditional ZDol or ZTetraol lubricants.

Traditional lubricants such as ZDol or ZTetraol only have anchoring hydroxyl groups (functional groups) on the two ends of the PFPE chain. When these hydroxyl groups anchor to the carbon overcoat, the long, flexible polymer chain often bulk up. The result is a lubricant with a high profile that tends to increase the surface roughness. Many of the low profile lubricants of the present invention also have functional groups on the two ends of the PFPE chain. In addition, however, they also have one or more functional groups in the middle of the PFPE chain. In one embodiment of the invention, for example, the functional group is a hydroxyl group. Preferably, the middle functional group(s) bonds to the carbon overcoat. When such bonding occurs, the polymer adjacent the functional group is dragged down to the carbon overcoat surface. The result is a lubricant that lies down more flatly on the surface of the media. That is, a low profile lubricant.

The basic structure of the low profile lubricants used in the present invention, however, is similar to Zdol and Ztetraol type PFPE lubricants. Because of this, low profile lubricants suffer from so of the same shortcomings. That is, the low profile lubricants incorporated in the mixtures of the present invention suffer catalytic decomposition in the presence of Lewis acids. Thus, the durability of low profile lubricants is similar to that of Zdol and Ztetraol.

Compounds with cyclophosphazene rings tend to be more resistant to catalytic decomposition due to Lewis acids and thus more durable. That is, cyclophosphazene rings provide chemical stability to the lubricant mixture. The inventors have discovered that attaching or incorporating one or more cyclophosphazene rings into a low profile lubricant provides chemical stability while preserving the low profile/higher clearance of the low profile lubricant.

Figure 1:
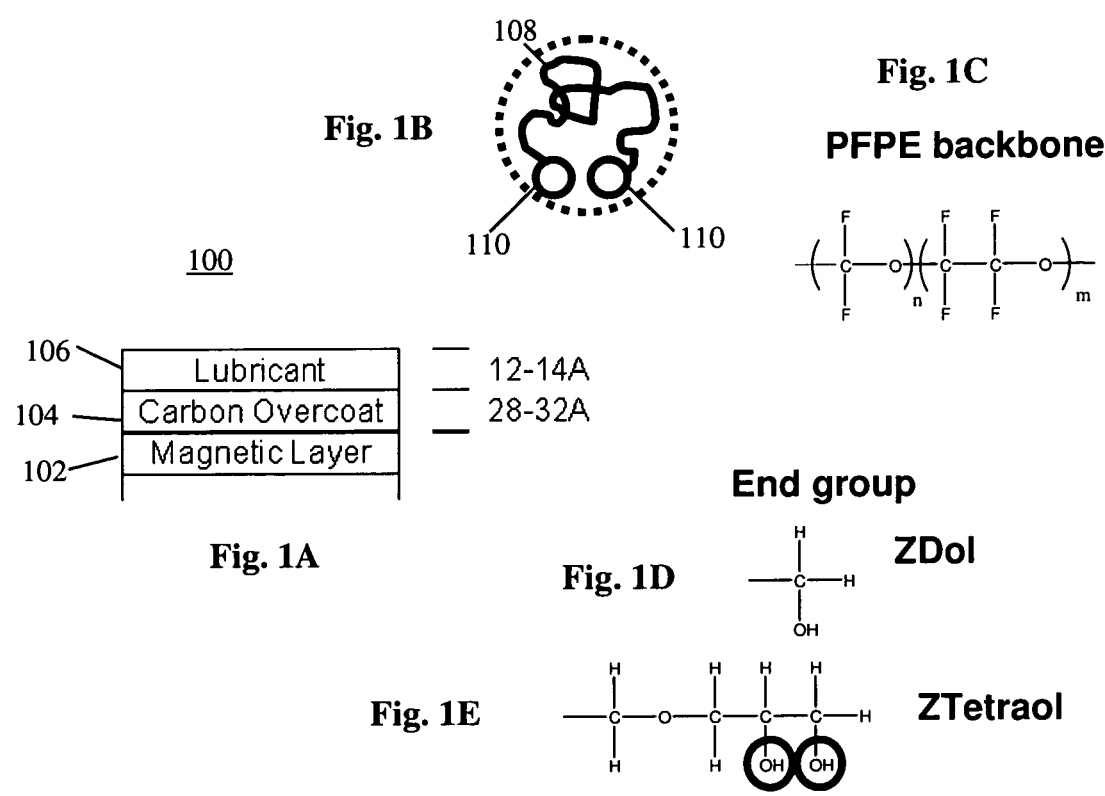
FIG. 1A is a schematic illustration of a media storage device.
FIG. 1B is a schematic illustration of a high profile lubricant.
FIG. 1C is a schematic illustration of a perfluoropolyether backbone.
FIG. 1D is a schematic illustration of the end group of a ZDol storage media lubricant.
FIG. 1E is a schematic illustration of the end group of a ZTetraol storage media lubricant.

FIG. 1A illustrates a media storage device 100. The media storage device 100 includes a magnetic layer 102, a carbon overcoat 104, and a high profile lubricant 106. The carbon overcoat 104 is a hard coating that protects the magnetic layer 102. The high profile lubricant 106 facilitates passage of the read/write head (not shown) over the media storage device 100.

FIG. 1B is a schematic illustration of a high profile lubricant 106. The high profile lubricant 106 has a PFPE backbone 108 with functional groups 110 at either end of the backbone 108. The functional groups 110 bond with the carbon overcoat 104, anchoring the high profile lubricant 106 to the surface of the media storage device 100. Because the backbone 108 is relatively long and is only anchored at two locations, the high profile lubricant 106 can bunch up on the surface. This is illustrated by the large dashed circle circumscribing the high profile lubricant molecule 106.

FIG. 1C illustrates the backbone 108 of a high profile PFPE. The end functional groups 110 of two high profile storage media lubricants 106 are illustrated in FIGS. 1D and 1E. FIG. 1D illustrates of the end functional group 110 of high profile storage media lubricant 106 ZDol while FIG. 1E illustrates of the end functional group of high profilel storage media lubricant 106 ZTetraol. ZDol has a single hydroxyl group at both ends of the PFPE backbone 108 while ZTetraol has two hydroxyl groups at the ends of the PFPE backbone 108.

Figure 2:
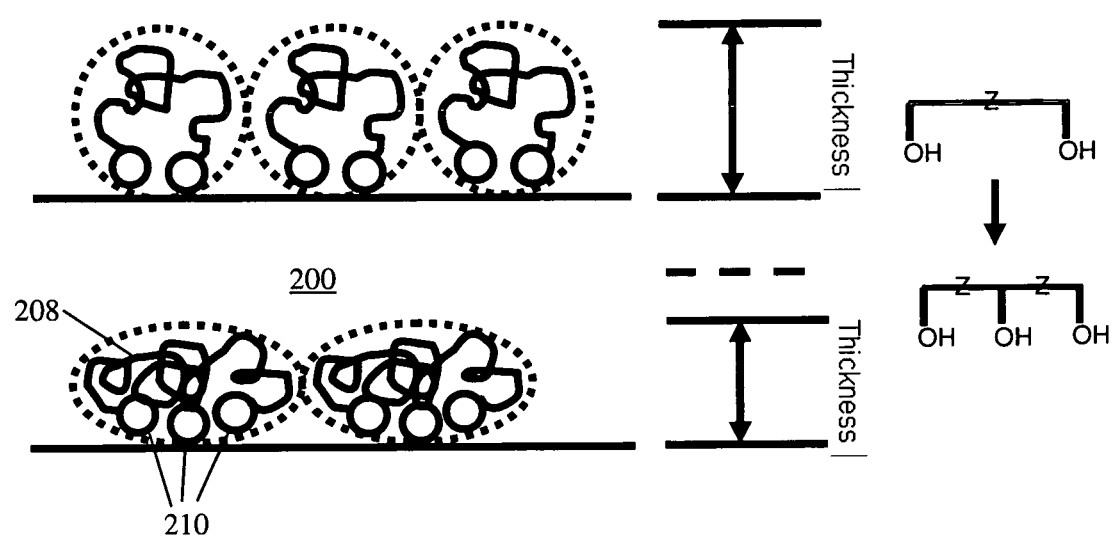
FIG. 2 is a schematic illustration comparing a low profile lubricant with a high profile storage media lubricant.

FIG. 2 is a schematic illustration comparing a low profile lubricant 200 of the present invention with a high profile storage media lubricant 106. In this embodiment, the low profile lubricant has three functional groups 210. Two of the functional groups 210 are at the ends of a PFPE backbone 208 similarly to the high profile lubricant 106. The low profile lubricant of the present embodiment, however, includes a third function group 210 in a region of the PFPE backbone 208 between the two ends. Preferably, in this embodiment the third functional group 210 is attached near the center of the PFPE backbone 208. However, the third functional group 210 need not be in the exact center.

In alternative embodiments of the invention, the low profile lubricant 200 includes a plurality of functional groups 210 attached in the region of the PFPE backbone 208 between the two ends. Indeed, Table I provides the molecular weight and number of functional groups for several low profile lubricants 200 prepared and evaluated by the present inventors. All six of the low profile lubricants 200 in Table I were fabricated by modifying a ZDol 1000 lubricant. The number of functional groups in the PFPE backbone 208 in Table I range from 3 to 8. However, the number of functional groups is not limited to 8. Preferably, the additional functional groups 208 could be spaced relatively equally along the backbone 208. However, it is not necessary that the spacing be equal.

TABLE I

| Lubricant | Starting Material | Mw (NMR) | # of —OH Per Molecule |
|---|---|---|---|
| LPL-001A | Zdol 1000 | 3700 | 4 |
| LPL-002B | Zdol 1000 | 1800 | 3 |
| LPL-002C | Zdol 1000 | 4100 | 5 |
| LPL-003B | Zdol 1000 | 3100 | 4 |
| LPL-003C | Zdol 1000 | 6900 | 8 |
| LPL-004C | Zdol 2000 | 12000 | 7 |

Figure 3:
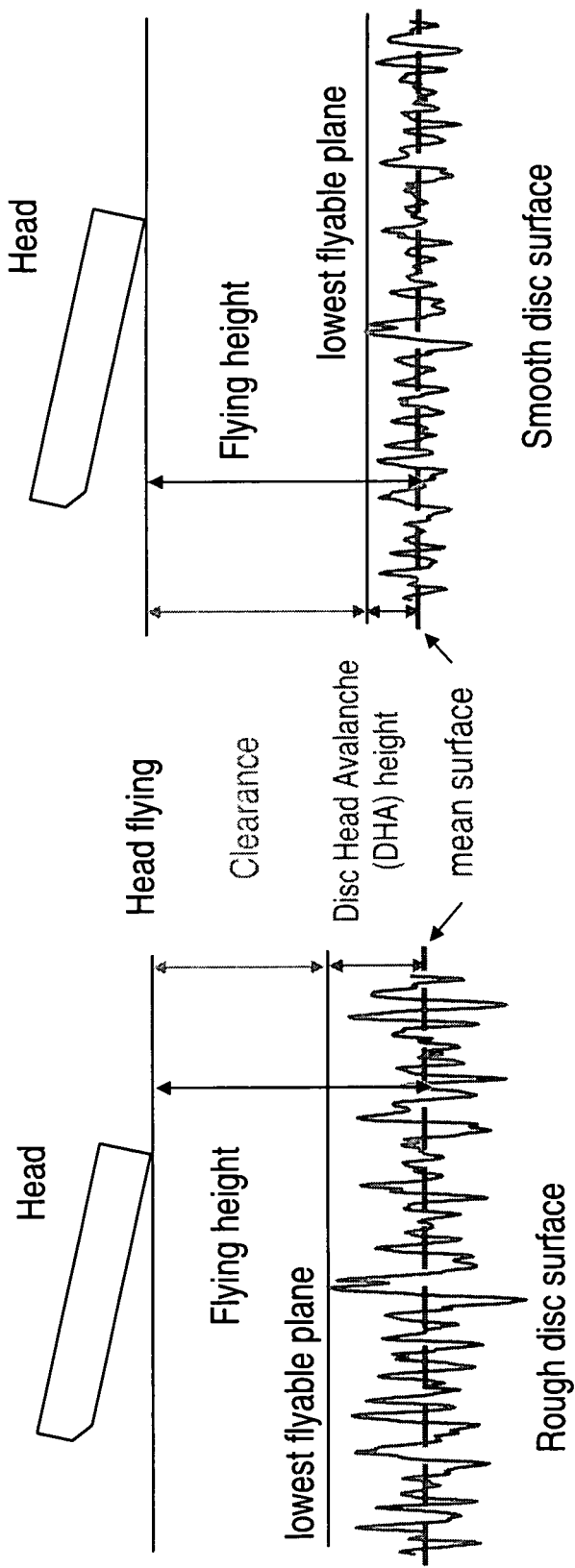
FIG. 3 is a schematic illustration comparing the disc head avalanche height of an embodiment of the present invention with high profile lubricants.

FIG. 3 is a schematic illustration comparing the disc head avalanche height and the clearance of a disc having a rough surface, i.e. one using a high profile lubricant, and a disc with a smooth surface, i.e. one using a low profile lubricant. The flying height of a media storage device is defined as the distance from the bottom of a flying read/write head to a theoretical line representing the mean surface of the disc. The clearance is the distance from the bottom of the flying read/write head to the highest peak on the actual surface of the disc. The difference between the two is the disc avalanche height. The disc head avalanche height is a measure of the amount of distance that is unavailable for a varying flying head to travel without hitting the surface. Conversely, the clearance is the amount of distance a varying flying head can travel without hitting the surface. A disc with a smooth surface has a smaller disc head avalanche height which translates into a larger clearance for a given flying height.

Embodiments of the present invention include a new lube system that has one or more cyclophosphazene rings attached to or incorporated into a low profile lubricant. The cyclophosphazene rings provide chemical stability to the lubricant while the low profile lubricant provides higher clearance than traditional PFPE lubricants. Further, because this is a single component system, production control is easy.

Figure 4:
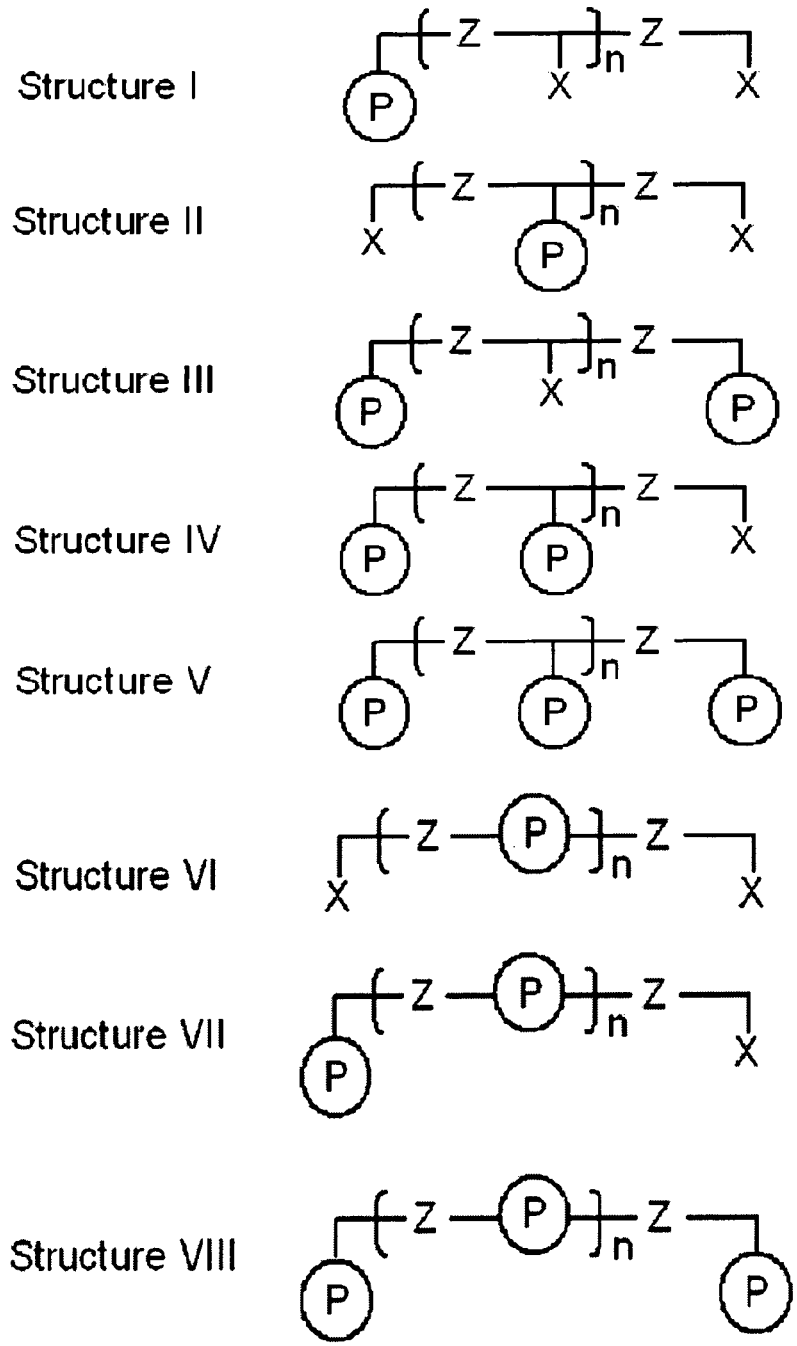
FIG. 4 lists compounds that have one or more cyclophosphazene ring attached or incorporated to perfluoropolyether chain according to an embodiment of the invention.

FIG. 4 lists 8 compounds having one or more cyclophosphazene rings attached or incorporated to perfluoropolyether chain. In this embodiment,

is a cyclophosphazene ring, Z is a perfluoropolyether chain, X is a mono or multifunctional group, and n is an integer. The high clearance property comes from the functional groups (X) on the on the PFPE backbone an/or the cyclophosphazene rings. That is, the additional functional groups relative to high profile lubricants result in a low profile lubricant, a low disc avalanche height, and a high clearance. In one preferred embodiment, the functional groups are hydroxy groups. In another embodiment of the invention, the functional group is a diol. Optionally, the cyclophosphazene ring may comprise alkoxy or aryloxy substituents. In one embodiment of the invention, the cyclophosphazene ring comprises hydroxyl groups.

The inventors have developed several techniques for the production of lubricants of the present invention. This embodiment, by way of example, concerns the synthesis of structure I illustrated in FIG. 1. Under nitrogen purge, 1.05 g (18.7 mmol) of potassium hydroxide in 5 ml DI water were added in 50.47 g (162 mmol) of A2OH (MW: 3000, 16.8 mmol) in a three-necked flask. The three-neck flask was equipped with mechanical stirring, a water-jacketed cooling condenser and a thermometer. The mixture was heated to 55° C. and stirred for 2 hrs. The mixture was then cooled down to 30° C. and stirred overnight. Then the mixture was heated to 65° C. and 15.42 g (167 mmol) of epichlorohydrin was added. After completing the addition of epichlorohydrin, the mixture was heated to 90° C. and stirred for 6 hrs.

The resulting product was washed with IPA. After washing, the product was treated by rotary evaporation to remove the IPA. The resulting intermediate was designated Ep-A2OH.

A second three-necked flask, equipped with a mechanical stirring, a water-jacketed cooling condenser and a thermometer, was then charged with 0.37 g (6.7 mmol) of potassium hydroxide in about 0.2 ml DI water and 6.8 g (6.7 mmol) of ZDol (MW: 1025). The solution was heated to 50° C. for 1 hr under stirring. Then, 20.0 g of EpA2OH was added to the solution drop wise in a period of 1 hr. The reaction was allowed to carry out overnight at 50° C. After washing with DI water, 20 ml of 1 M HCl was added to the oil. Stirring was continued for 2 hrs. The product was then washed with DI water and IPA. The water and IPA were removed by rotary evaporation. The total yield of Structure I was 30%.

The preceding method describes one method of producing Structure I. Similar methods may be employed to produce the various lubricants of the invention, including the other structures illustrated in FIG. 4.

The present invention also includes storage media devices having lubricants as described above. Preferably, storage media according to this embodiment of the invention includes a disc having a magnetic layer with a protective carbon on top. On top of the protective carbon layer, any low profile lubricant having one or more cyclophosphazene rings attached to or incorporated into a perfluoropolyether backbone and having at least two functional groups can be deposited. The functional groups may be attached to the backbone, attached to the one or more cyclophosphazene rings, or any combination thereof.

The implementations described above and other implementations are within the scope of the following claims.

The invention claimed is:

1. A compound comprising:
a backbone comprising a perfluoropolyether chain;
one or more cyclophosphazene rings incorporated into the backbone; and
at least two functional groups attached to the backbone, attached to the one or more cyclophosphazene rings, or a combination thereof.

2. The compound of claim 1, wherein the compound is selected from the group consisting of:

Structure II

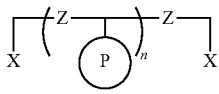

Structure IV

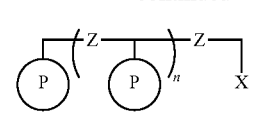

Structure V

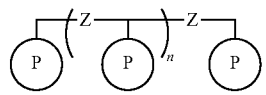

Structure VI

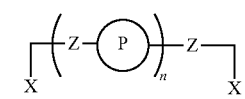

Structure VII

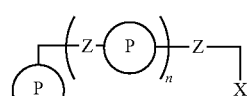

Structure VIII

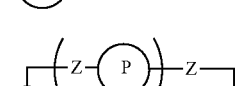

wherein

is a cyclophosphazene ring, Z is a perfluoropolyether chain, X is a mono or multifunctional group, and n is an integer.

3. The compound of claim 1, wherein the cyclophosphazene ring comprises alkoxy or aryloxy substituents.

4. The compound of claim 1, wherein the cyclophosphazene ring comprises hydroxyl groups.

5. The compound of claim 1, wherein X is a hydroxyl or a diol.

* * * * *